United States Patent [19]
Lancki

[11] Patent Number: 6,097,998
[45] Date of Patent: Aug. 1, 2000

[54] METHOD AND APPARATUS FOR GRAPHICALLY MONITORING AND CONTROLLING A VEHICLE ANTI-LOCK BRAKING SYSTEM

[75] Inventor: Alfred L. Lancki, Cuyahoga, Ohio

[73] Assignee: AlliedSignal Truck Brake Systems Co., Elyria, Ohio

[21] Appl. No.: 09/151,544

[22] Filed: Sep. 11, 1998

[51] Int. Cl.[7] ............................. G06F 17/00; G01L 5/28
[52] U.S. Cl. ................................... 701/33; 701/35
[58] Field of Search .................. 701/29, 33, 35

[56] References Cited

U.S. PATENT DOCUMENTS

| | | | |
|---|---|---|---|
| 4,831,868 | 5/1989 | Makino | 73/118.1 |
| 5,214,582 | 5/1993 | Gray | 364/424.03 |
| 5,272,769 | 12/1993 | Strnatka et al. | 345/346 |
| 5,541,840 | 7/1996 | Gurne et al. | 364/424.03 |
| 5,557,523 | 9/1996 | Yeh et al. | 701/29 |
| 5,774,361 | 6/1998 | Colarelli, III et al. | 701/29 |
| 5,916,287 | 6/1999 | Arjomand | 701/29 |
| 5,923,161 | 7/1999 | Frankovitch, Jr. et al. | 324/115 |

Primary Examiner—Michael J. Zanelli

[57] ABSTRACT

A method and apparatus for graphically monitoring and controlling a vehicle anti-lock brake system is provided. Multiple types of graphical data concerning different aspects of the anti-lock brake system are simultaneously displayed to a technician. Output lights provided as a part of the vehicle anti-lock brake system are graphically emulated on a display terminal. Various vehicle anti-lock brake system components, such as a retarder relay, modulators, indicator lights, and the like, are controllable through a graphical user interface, and both the presence and location of anti-lock brake system faults is graphically indicated to a technician. The method and apparatus also include graphically displaying real-time or previously recorded wheel speed data for all or selected individual wheels connected to a vehicle anti-lock brake system, alone or in combination with other graphical data, and for saving real-time wheel speed data for subsequent review. Communications data sent to and from the anti-lock brake system electronic control unit is also graphically displayed to a technician.

20 Claims, 13 Drawing Sheets

METHOD AND APPARATUS FOR GRAPHICALLY MONITORING AND CONTROLLING A VEHICLE ANTI-LOCK BRAKING SYSTEM

BACKGROUND OF INVENTION

The present invention relates generally to a method and apparatus for monitoring and controlling vehicle brake systems, and more particularly to a method and apparatus for graphically monitoring and controlling a vehicle anti-lock brake system (ABS) through a selectively connected portable computer or the like for purposes of locating, diagnosing, and repairing brake system faults and for graphically monitoring overall operation of the ABS.

Prior methods and apparatus have been used to monitor and control certain aspects of vehicle electronic systems such as ABS. While graphical tools have existed for monitoring engine-related electronics, prior methods and apparatus for monitoring and controlling an ABS have been primarily text-based systems controllable through a variety of complicated textual input commands such as those commonly used to control DOS-based computer systems. Because these systems had no common "look and feel" or user interface, they required a service technician or other user to be highly skilled in order to effectively and efficiently learn and operate the system. Entry of improper commands, switches, parameters, and other textual input potentially resulted in improper and incomplete brake system diagnosis which, in turn, resulted in improper or unnecessary repairs and/or failure to properly diagnose ABS faults. Furthermore, these systems sometimes required an operator to interpret a large amount of complicated numerical and textual output data regarding the anti-lock brake system—i.e., the output data was not presented in a clear and concise form. While engineers and highly skilled technicians were generally able to interpret such output data, some automobile and truck mechanics not familiar with these prior systems experienced difficulty entering the proper input commands and interpreting the output data without assistance.

Other prior systems are units which are dedicated to monitoring and diagnosing particular vehicle electronic systems—i.e., these prior units have not been usable for any other purpose. Such systems have also been entirely or primarily text-based systems with the above-noted drawbacks and deficiencies. Obviously, such dedicated systems which are usable for only a limited number of purposes increase the cost to service technicians and other users which must purchase these systems for each of a wide variety of vehicle electronic systems.

Vehicles equipped with ABS typically include one or more dashboard lights visible by a driver of the vehicle. The dashboard lights are selectively illuminated to indicate certain ABS conditions to the driver. For example, the lights may be illuminated during vehicle power-up, during an ABS and/or traction control event, and/or in the event of an ABS fault. Prior ABS diagnostic methods and apparatus have not provided convenient and effective means for a technician to test these dashboard lights while also providing a graphical indication of the dashboard light control output from the ABS electronic control unit. The inability to control and/or monitor the dashboard lights renders fault diagnosis more difficult and time consuming.

ABS systems also include an electronic control unit (ECU) carried by the vehicle for controlling the ABS. Certain ECU's, such as those manufactured by AlliedSignal Truck Brake Systems Company, and/or certain diagnostic units selectively connected thereto, may include a series of lights (typically provided by light emitting diodes (LED's)) used to indicate various ABS conditions. For example, illumination of certain LED's on the ECU may indicate proper ECU function while illumination of others may indicate the presence and/or location of ABS faults. The LED's are also used to indicate the ABS and traction control configuration during power-up. Heretofore, there has been no convenient and effective means by which a technician has been able to test the proper ECU control of these LED's and other output lights. In certain cases, it is also very difficult to view the lights provided on the ECU, itself.

Methods and apparatus for ABS monitoring and diagnosis have also not heretofore included means for numerically and graphically displaying the speed of each wheel of the system wherein the data could be (i) recorded, replayed, saved, and loaded; (ii) filtered for display of selected wheel data; and (iii) displayed together with vehicle velocity data. Of course, these prior systems included no means for a technician to view the numerical and graphical wheel speed data together with other graphical ABS data such as current fault data. Likewise, the prior systems have not included means for recording wheel speed data for purposes of graphically displaying same at a later time.

In general, prior ABS diagnosis systems have not been found to be convenient and easy to use, and it has been deemed desirable to develop new and improved methods and apparatus for graphically monitoring and controlling a vehicle anti-lock brake system.

SUMMARY OF THE INVENTION

In accordance with the present invention, a method and apparatus for graphically monitoring and controlling a vehicle anti-lock brake system is provided.

In accordance with a first aspect of the present invention, a method of graphically monitoring an anti-lock braking system of a vehicle includes receiving fault status data representing anti-lock braking system faults from an electronic control unit of the anti-lock braking system. A graphical anti-lock braking system current fault status display is displayed to a technician by displaying a graphical representation of the vehicle anti-lock braking system, and by displaying at least one graphical fault indicator at a select location on the graphical representation of the anti-lock braking system, said at least one graphical fault indicator associated with at least one component of said anti-lock braking system and displayed to indicate the presence of a fault condition in the at least one anti-lock braking system component associated therewith.

In accordance with another aspect of the present invention, an apparatus for graphically monitoring and controlling a vehicle anti-lock braking system includes a computer apparatus adapted for selective connection to an electronic control unit of the anti-lock braking system. The computer apparatus includes a visual output device for outputting graphical data received from said computer apparatus, a keyboard for operator input of data to said computer apparatus, a pointing device for operator input of commands to the computer apparatus through a graphical user interface, and means for receiving fault data from the electronic control unit of the anti-lock braking system. The apparatus also includes means for outputting a graphical fault status display to the visual output device. The fault status display includes a graphical representation of a vehicle anti-lock braking system, and at least one graphical fault indicator displayed at a select location on the graphical representation of a vehicle anti-lock braking system. The graphical fault indicator is associated with at least one component of the anti-lock braking system and displayed in a fault state to indicate a fault associated with the at least one associated anti-lock brake system component. The apparatus also includes means for outputting a graphical modulator test display to the visual output device. The graphical modulator test display includes regions selectable by the pointing device to selectively include each of a plurality of modulators of the anti-lock braking system in a modulator test, and a region selectable by the pointing device to instruct the electronic control unit to operate exhaust and hold solenoids for each of the modulators of the anti-lock braking system included in the modulator test.

In accordance with another aspect of the present invention, a method of monitoring and controlling a vehicle anti-lock braking system (ABS) includes displaying a graphical representation of at least one output indicator light of said ABS to a technician wherein the at least one output indicator light of the ABS and the graphical representation thereof each have first and second states. The method further includes displaying a graphical switch region to a technician. The graphical switch region is selectable by a technician using a graphical user interface pointing device. The state of both the at least one output indicator light and the graphical representation of the at least one output indicator light is changed upon selection of the at least one graphical switch region with a graphical user interface pointing device.

One advantage of the present invention is the provision of a method and apparatus for graphically monitoring and controlling a vehicle anti-lock brake system.

Another advantage of the present invention resides in the provision of a method and apparatus for graphically monitoring and controlling a vehicle anti-lock brake system wherein multiple types of graphical data concerning different aspects of the anti-lock brake system are simultaneously displayed to a technician.

A further advantage of the present invention is found in the provision of a method and apparatus for graphically monitoring and controlling a vehicle anti-lock brake system by emulating and controlling output lights provided as a part of the vehicle anti-lock brake system or as a part of an associated interface unit.

Another advantage of the present invention is found in the provision of a method and apparatus for graphically controlling the operation of various vehicle anti-lock brake system components such as a retarder relay, modulators, indicator lights, and the like, for purposes of testing same.

A still further advantage of the present invention resides in the provision of a system for graphically displaying both the presence and location of anti-lock brake system faults and for selectively displaying textual fault information.

A yet further advantage of the present invention is found in a method and apparatus for graphically displaying real-time or previously recorded wheel speed data for all or selected individual wheels connected to a vehicle anti-lock brake system, alone or in combination with other graphical data, and for saving real-time wheel speed data for subsequent review.

Still other objects, features, and advantages of the present invention will become apparent to those of ordinary skill in the art upon reading and understanding the present application in conjunction with the drawings.

BRIEF DESCRIPTION OF THE DRAWINGS

The invention may take form in various components and arrangements of components, and in various steps and arrangements of steps. The drawings are only for purposes of illustrating preferred embodiments and are not intended to limit the invention.

DETAILED DESCRIPTION OF THE INVENTION

While various types of motor vehicle braking systems may incorporate the features of the present invention, including hydraulic fluid and pneumatic (air) brake systems, this invention is described and illustrated in connection with an air brake system of a type typically used for heavy duty truck applications.

Figure 1:
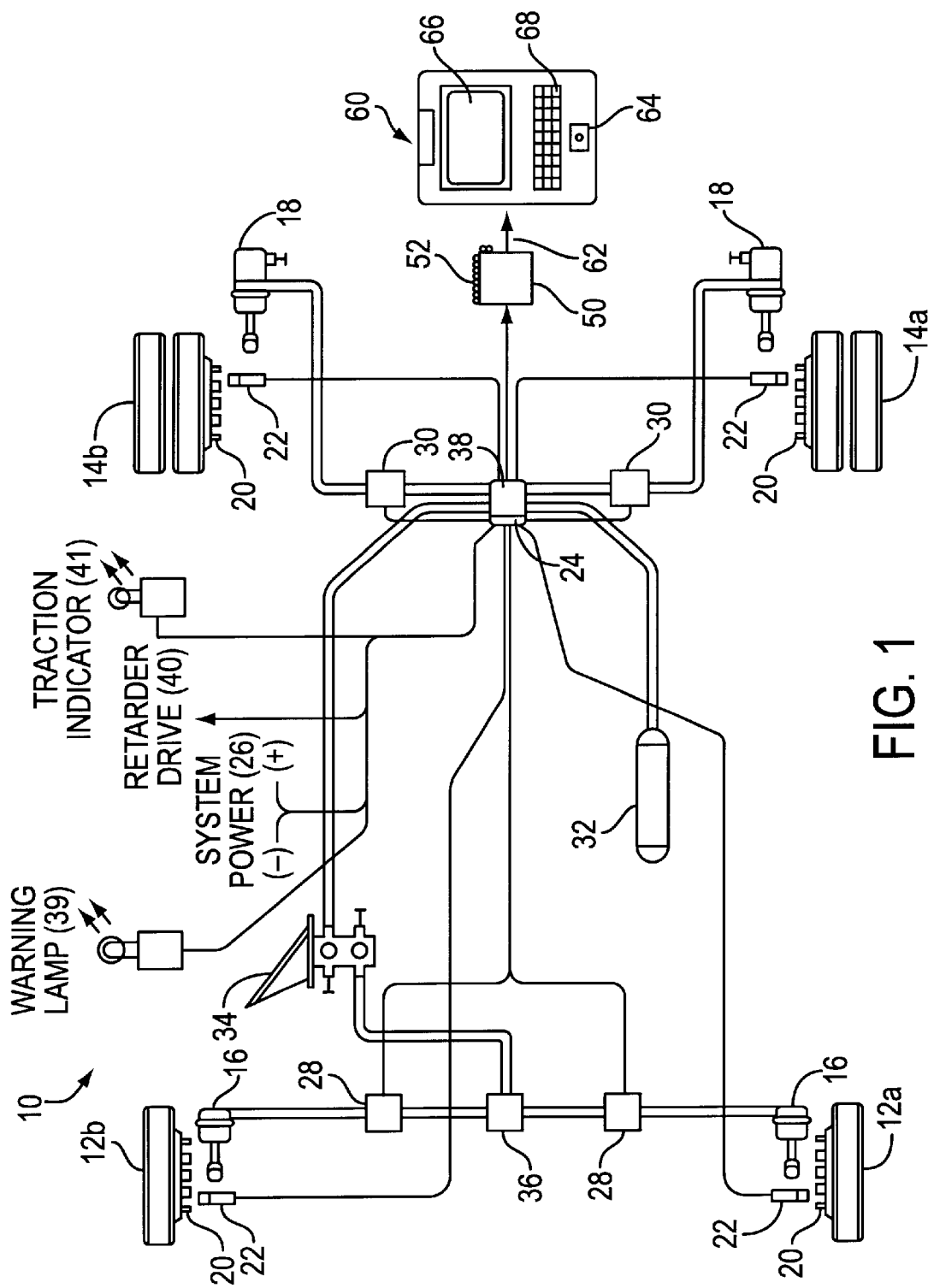
FIG. 1 diagrammatically illustrates a vehicle anti-lock brake system and an apparatus for graphically monitoring and controlling same in accordance with the present invention.

Referring now to the drawings wherein the showings are for purposes of illustrating preferred embodiments of the invention only and not for purposes of limiting same, a pneumatic vehicle anti-lock braking system (ABS) is shown diagrammatically in FIG. 1 and is generally designated by reference number 10. As is known to those of ordinary skill in the art, a traction control system (ATC) is typically provided on an ABS system, and it is intended that the term ABS as used herein encompass an anti-lock brake system including traction control capabilities. Furthermore, ABS systems are provided in a wide variety of forms for powered and non-powered vehicles. For powered vehicles, common ABS configurations are 4 sensor/4 modulator (4S/4M), 6S/6M, 4S/2M, 2S/2M, and 2S/1M. For trailers, dolly systems, and other non-powered vehicles, common configurations are 2S/1M, 2S/2M, 4S/2M. Those skilled in the art will recognize that the present invention has equal application to all these and other ABS configurations, and the invention is not intended to be limited for use in conjunction with any particular ABS configuration.

The system 10 includes various components connected by solid lines to designate electrical connections and by parallel lines to designate air flow conduits. System 10 includes steerable left and right front axle wheels 12a,12b (referred to generally as wheels 12) and driven left and right rear axle wheels 14a,14b (referred to generally as wheels 14). Front axle brake actuators 16 are provided and are linked to brake shoes when drum type brakes are used, or a caliper for a disc brakes, to exert braking action on the drum or brake rotor that rotates with the associated wheels 12. Similarly, rear axle brake actuators 18 are also provided to exert braking action on drums or rotors connected to rotate with the wheels 14. Typically, the rear brake actuators 18 also incorporate an internal spring which engages the brake when air pressure is not applied to the system, thus providing a parking and emergency brake feature. In order to move the vehicle, air pressure must be applied to actuators 18 to overcome the force exerted by the internal springs and release the braking system.

ABS and traction control systems require wheel speed input signals which are provided through the use of an exciter or tone ring 20 which rotates with each of the wheels. Wheel speed sensors 22 mounted to the vehicle chassis are positioned adjacent the tone rings 20 and provide an output in the form of an AC signal which varies in voltage and frequency as the speed of the associated wheel 12,14 increases or decreases. Variable reluctance transducers are frequently employed for this application in which the flux density in the gap between tone ring 20 and wheel speed sensor 22 varies as the tone ring teeth move across a pole piece of the wheel speed sensor 22.

Braking system 10 is controlled by electronic control unit (ECU) 24, such as an EC-17 brake controller available commercially from Allied-Signal Truck Brake Systems Co., which receives wheel speed signals from each of the associated wheel speed sensors 22 and receives system power from the vehicle power supply 26. ECU 24 includes an internal computer along with interface components for controlling system 10. The ECU 24 may include a series of output LED's or other lights (not shown) for indicating faults and other ABS status information to a technician.

Front axle brake modulators 28 and rear axle brake modulators 30 are provided adjacent the front and rear wheels 12,14, respectively, and are each connected with an associated brake actuators 16,18. The modulators 28,30 include solenoid valves (not shown) which are controlled by the ECU 24 as previously discussed so that the modulators 28,30 modify air pressure provided to the actuators 16,18 for activating or "applying" the vehicle brakes. ECU 24 is capable of simultaneously and independently controlling the four individual brake modulator assemblies 28,30. Those skilled in the art will recognize that additional wheels may be provided and controlled by the ABS 10.

The brake control system 10 includes an air pressure accumulator tank 32 which serves as a high pressure reservoir. A brake system control valve 34 is actuated by the vehicle operator (typically through application of foot pressure) to activate the vehicle brakes. As shown herein, the vehicle brake system 10 includes separate front and rear axle brake portions. The front brake portion includes a quick release valve 36 which receives air pressure signals for the front axle and, through front axle brake modulators 28, sends air pressure signals to front axle brake actuators 16. In a similar manner, air pressure signals are sent to rear axle brake actuators 18 through a traction system control valve 38 and modulators 30.

As further shown in FIG. 1, an ABS warning light 39 is provided, typically as a part of the dashboard display, and controlled by the ECU 24 to warn the vehicle operator and/or service technician of a faulty or disabled system. The ECU 24 also includes a retarder drive output 40 and a traction control (ATC) indicator light 41 to notify the vehicle operator and/or service technician that the system is operative.

The vehicle braking system 10 incorporates ABS features in which the deceleration rate of each of the road wheels 12a,12b,14a,14b is monitored during braking actions. In the event of wheel lock-up (skid) or impending wheel lock-up, appropriate control signals are directed from the ECU 24 to the subject wheel's brake modulator 28,30 to relieve braking pressure in accordance with conventional ABS system operation. Likewise, the system 10 implements traction control through use of differential braking action across the driven wheels 14.

With continuing reference to FIG. 1, an ABS interface unit 50 is selectively connected to the ABS ECU 24 through the vehicle diagnostic data link. One suitable interface unit 50 is the Diagnostic Communication Interface (DCI) which is commercially available from AlliedSignal Truck Brake Systems Co. Although it is not intended that the present invention be limited for use with any particular interface unit 50, the invention is described with particular reference to the AlliedSignal DCI unit which is described in full detail in commonly owned and co-pending patent application Ser. No. 09/031,810 entitled "Diagnostic Communication Interface DCI" filed Feb. 27, 1998, the disclosure of which is expressly incorporated by reference herein. The co-pending Ser. No. 09/031,810 application particularly describes connection of the DCI unit 50 to the ECU 24 and the communication therebetween.

The interface unit 50 may also include a plurality of indicator lights 52 such as light emitting diodes (LED's) or other output lights by which a technician is able to assess the status of the ABS 10. If provided, these lights 52 are intended to emulate similar output lights provided on the ECU 24 or provide a means for a technician to assess the status of an ABS which includes an ECU without any output indicator lights. While use of interface units including ECU status lights, such as the AlliedSignal DCI, has greatly simplified ABS fault diagnosis, in many instances it has been deemed desirable for a technician to be able to test the ECU indicator lights, view the communications data between the unit 50 and the ECU 24, and to control and monitor other aspects of the ABS 10. For example, use of an interface 50 does not allow a technician to simultaneously view wheel speed data and current fault data, or to selectively energize the exhaust and hold solenoids of the brake and traction modulators 28,30,38.

For these purposes and others, in accordance with the present invention, an apparatus for graphically monitoring and controlling an anti-lock brake system is provided, preferably by a general purpose computer 60 programmed as described herein and connected to the interface unit 50 through use of a wired or wireless data connection such as an RS-232 serial data connection. The computer 60 is preferably a portable or "lap-top" style computer including an Intel 80486 or Pentium processor operating under the control of Microsoft Windows (™) or Microsoft Windows 95 (™) operating system or like operating system including a graphical user interface (GUI). The computer apparatus 60 may be programmed in any suitable programming language that allows for display of the graphical means for monitoring and controlling the ABS 10 as described herein. For example, suitable programming languages include C++, Java, Delphi, Visual Basic, and the like. The computer 60 includes a mouse which a pointing device 64 by which an operator is able to select items displayed on the output display 66 with an associated cursor. A keyboard or key pad 68 is also provided for operator input to the computer 60. The apparatus 60 is programmed in accordance with the present invention to provide graphical monitoring and control of the ABS 10 as described and shown herein.

Figure 2:
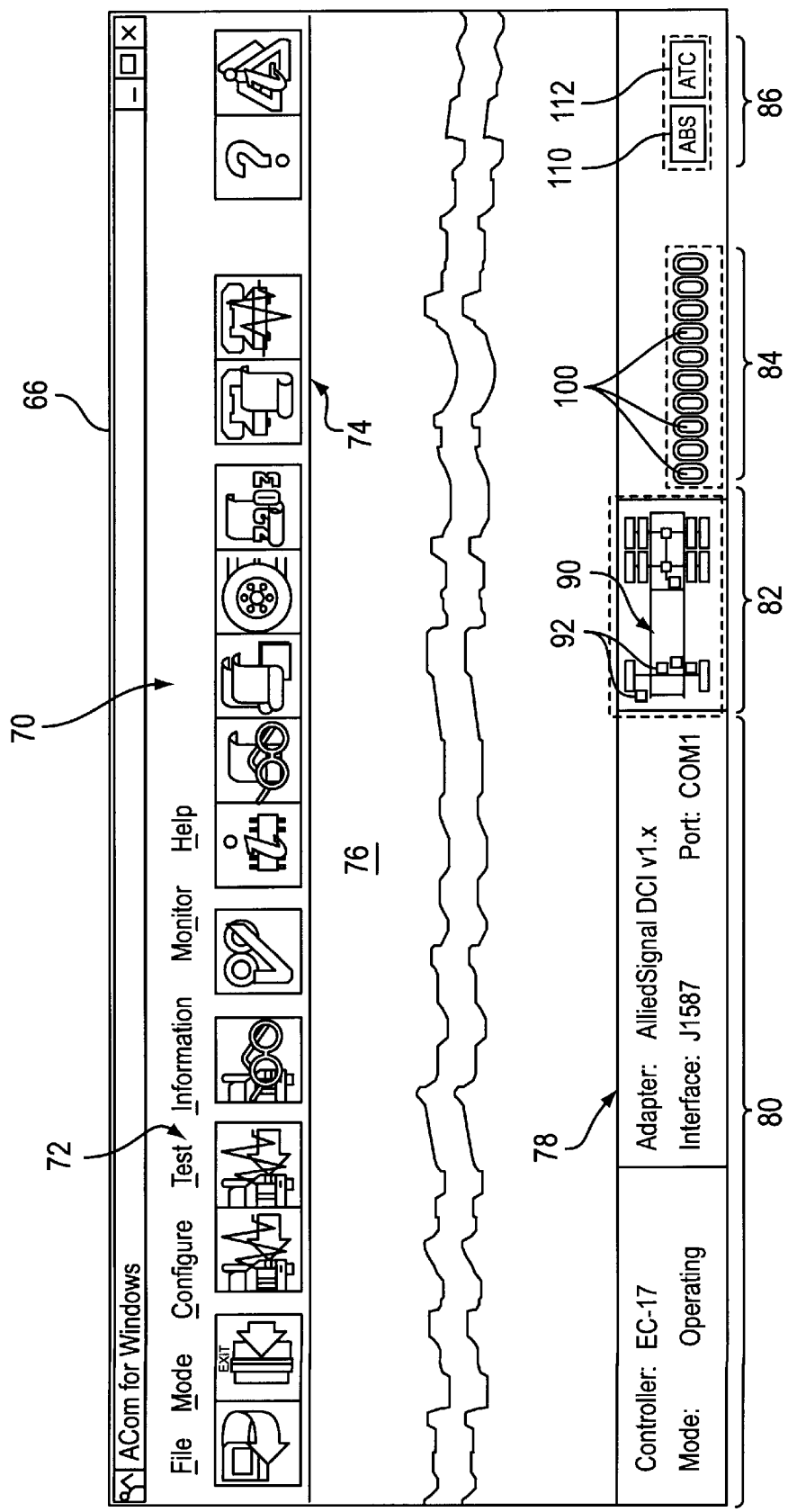
FIG. 2 illustrates a main graphical display in accordance with the method and apparatus of the present invention.

The display means 66 of the ABS monitoring and controlling apparatus 60 is illustrated in FIG. 2 as it appears when displaying a main screen display 70 in accordance with the present invention. The main screen display output by the apparatus 60 includes a menu region 72 for displaying top-level menu selections—File, Mode, Configure, Test, Information, Monitor, and Help—to a technician. A plurality of sub-selections are associated with each top-level selection and are displayed when a technician selects one of the top-level selections with the pointing device 64. Therefore, the technician is able to perform a wide variety of tasks with the apparatus 60 by using the pointing device 64 to select the appropriate choice and sub-choice from the menu region 72 of the display 70. A tool bar region 74 includes a plurality of different tool bar selections by which a technician is able to cause a particular operation to be carried out without navigating the top-level and sub-selections in the menu region 72. The main display 70 also comprises a working region 76 used to display graphical and textual data from the ABS 10 to a technician. Finally, the main display 70 includes a status display region 78 used to continuously display real-time information concerning the status of the ABS 10 to a technician, regardless of other monitoring and controlling operations being performed by the technician using the apparatus 60.

With continuing reference to FIG. 2, the status display region 78 displayed by the apparatus 60 preferably comprises a general status region 80 for displaying general status information to a technician concerning the model of ECU 24, the ECU operating mode, the type of interface unit 50 being used (e.g., AlliedSignal DCI), and other such information. The status display region 78 also preferably includes a graphical Current Fault display 82, a graphical LED Status display 84, and a graphical Dashboard Lamp Status display 86.

The graphical Current Fault Status display 82 preferably comprises a graphical representation or icon 90 depicting a top plan or other illustrative view of the antilock brake system 10 being monitored and/or controlled through use of the apparatus 60. The Current Fault Status display 82 further comprises a plurality of graphical fault indicators 92 placed at select locations in association with the ABS display icon 90 to indicate the presence or absence of faults with respect to one or more components of the ABS 10 through use of different colors, shapes, and the like. Preferably the apparatus 60 continuously receives fault data from the interface unit 50 and updates the graphical fault indicators 92 in real-time so that current faults are displayed to a technician, e.g., by displaying a fault indicator 92 not formerly displayed or by changing the color of a displayed fault indicator 92 from green or another color (indicating a "no-fault" condition) to red or another color (indicating a "fault" condition). Also, as is described in full detail below, each graphical fault indicator 92 is preferably positioned on the ABS diagram 90 of the current fault display 82 at a specified location corresponding to the location of one or more actual components of the ABS 10 so that the current fault status display graphically informs a technician of both the presence and location of a fault regardless of what other information is being viewed by the technician in the working area 76 of the display 70.

Figure 6:
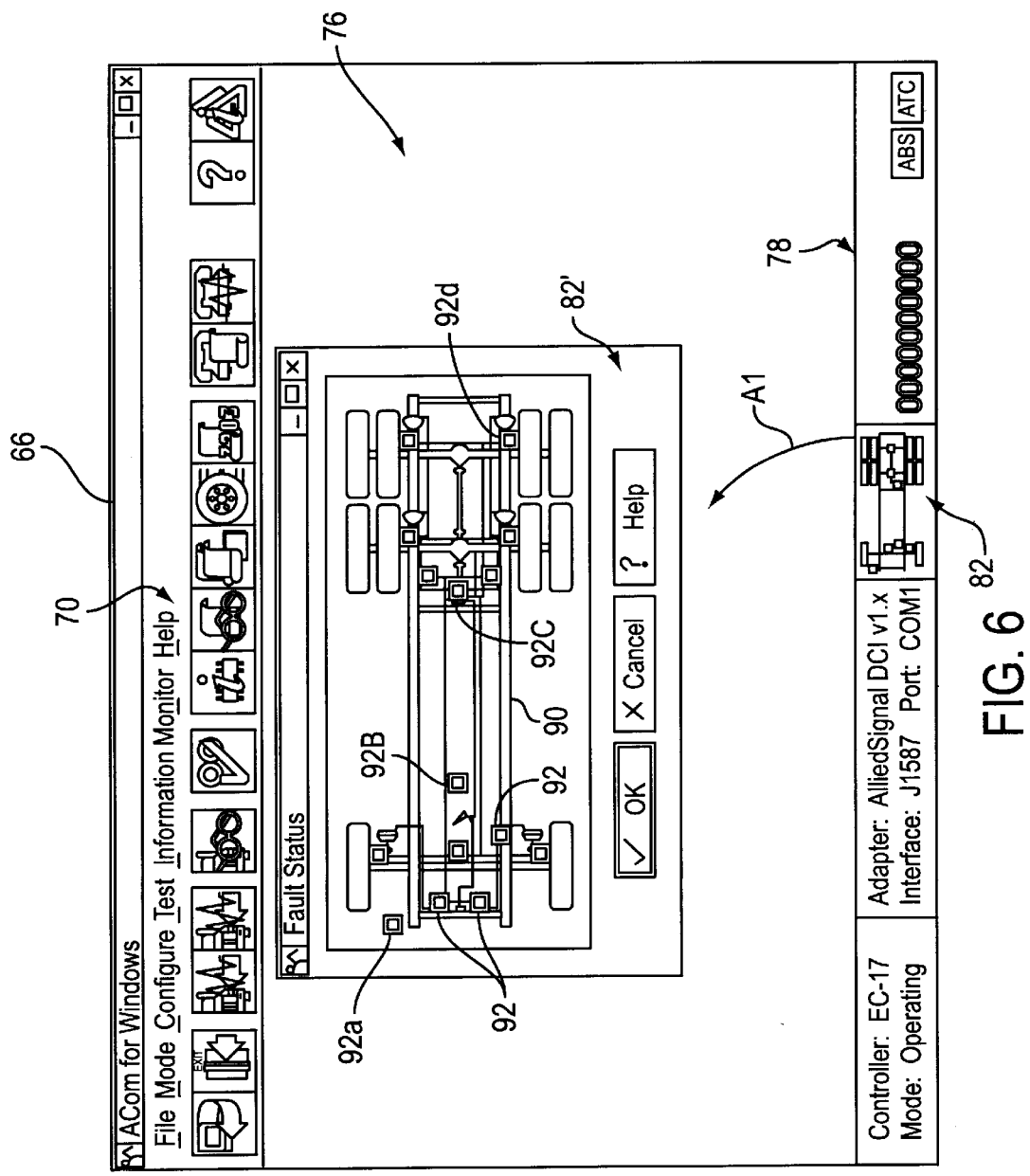
FIG. 6 illustrates a graphical display in accordance with the method and apparatus of the present invention including a graphical fault display for identifying the presence and location of anti-lock brake system faults.

With reference also to FIG. 6, a technician is able to use the pointing device 64 to select the Current Fault Status display 82 and move or "drag" same (indicated by the arrow A1) from the status display region 78 to the working area 76 (as identified by the display 82') where the Current Fault Status display 82' is able to be located as desired and viewed alone or together with any other graphical display as described herein. As may be seen most clearly with reference to the enlarged Current Fault Status display 82', the fault indicators 92 are located on the graphical ABS diagram 90 at select locations to identify particular faults. By way of example, the fault indicator 92a can be used to inform a technician of a vehicle battery/voltage fault; the indicator 92b—a traction control fault; the indicator 92c—a fault in the ECU 24; and the indicator 92d—a left rear speed sensor fault. Also, when a technician uses the pointing device 64 to position the pointing device cursor over one of the displayed graphical fault indicators 92, a textual description of the associated ABS fault is displayed to the technician. Of course, those of ordinary skill in the art will recognize that many other fault types and locations may be identified by the graphical fault indicators 92, and the invention is not intended to be limited to those shown or described herein.

Referring again to FIG. 2, the graphical LED Status display 84 is used to emulate the LED's or other output lights on the ECU 24 and/or the interface unit 50. In the illustrated example, the LED Status display includes 10 graphical LED indicators 100 corresponding respectively to indicator lights found on the ECU 24 and/or interface unit 50. Accordingly, the apparatus 60 displays the LED Status display 84 and continuously updates same in real-time to emulate the state (i.e., "on" or "off") of the output lights on the ECU 24 and/or the interface unit 50 so that a technician is able to determine the indicated status of each LED or other light on the ECU 24 and/or unit 50 by simply viewing the LED status display 84 of the apparatus 60, alone or in combination with other data displayed on the screen display 66. of course, the actual status of any output light on the ECU and/or interface unit must be visually determined to account for faulty lights and associated circuitry. Preferably, the apparatus 60 emulates the "on" and "off" states of lights such as the lights on the ECU 24 and/or unit 50 by changing the color and/or brightness of the corresponding indicator, such as the indicators 100 of the display 84. Again, when a technician uses the pointing device 64 to immovably position the pointing device cursor over one of the indicators 100, a textual description of the graphical indicator is displayed to the technician.

Figure 7:
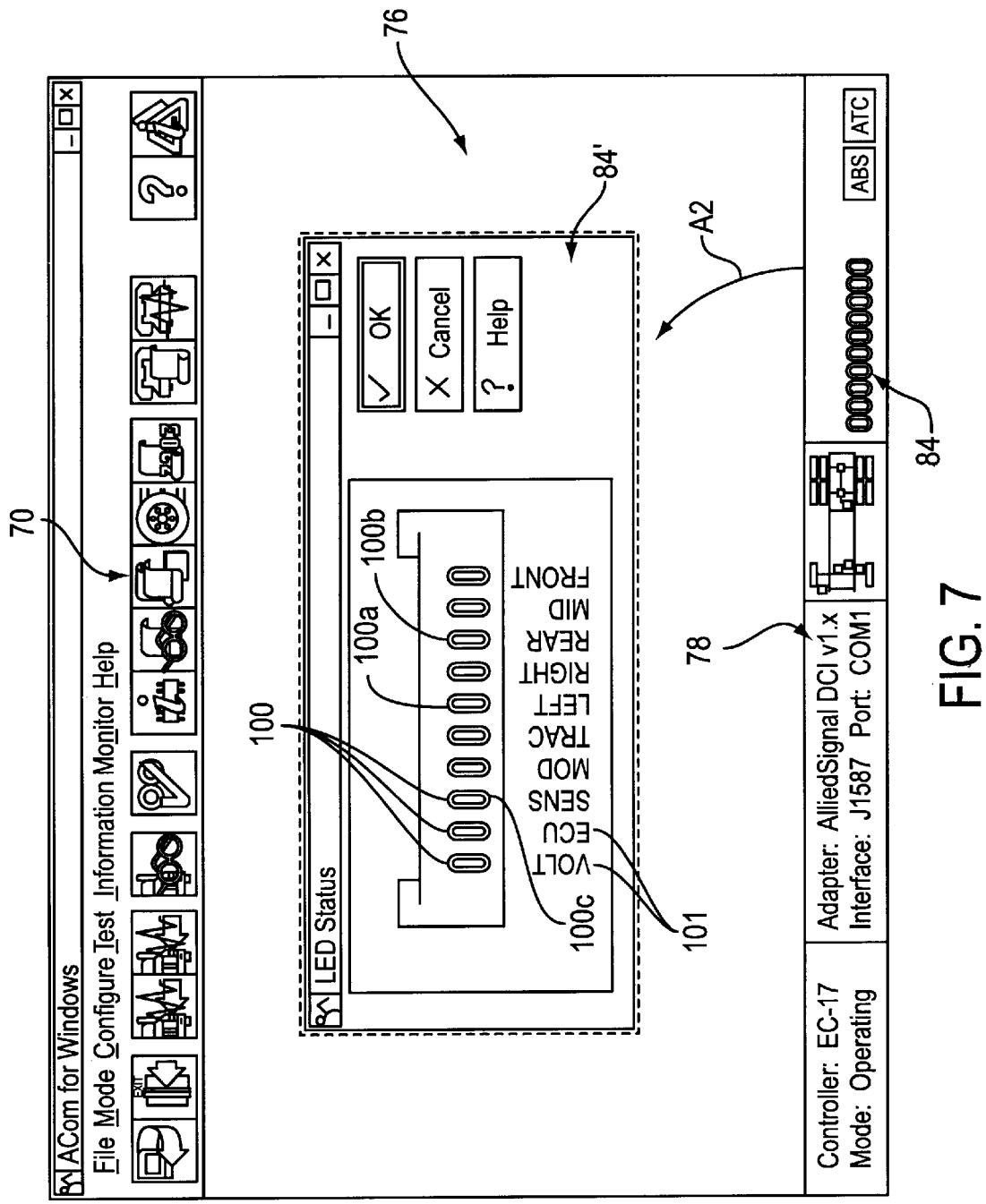
FIG. 7 illustrates a graphical display in accordance with the method and apparatus of the present invention including a graphical LED status display for emulating LED's found on the anti-lock brake system electronic control unit and/or on a separate interface unit; and, FIG. 8 illustrates a graphical display in accordance with the method and apparatus of the present invention including a dashboard lamp status display for emulating the anti-lock brake system dashboard lamps of the vehicle anti-lock brake system.

With reference also to FIG. 7, a technician is also able to use the pointing device 64 to select the LED Status display 84 and drag same (as indicated by the arrow A2) from the status region 78 of the display 70 to the working region 76 as indicated at 84'. Once it has been expanded to the working region 76, the LED Status display 84' is movable by the technician as desired for optimized viewing alone or together with other graphical data.

With continuing reference to FIG. 7, once it has been moved to the working region 76, the LED Status display 84' preferably comprises textual or other identifiers 101 used to identify the particular function of each graphical indicator 100. In this manner, a technician is able to determine the exact fault(s) in the ABS 10. For example, the indicators 100a,100b,100c include the identifiers "LEFT" "REAR" and "SENS" respectively. Accordingly, when the apparatus 60 determines that the corresponding actual status lights on the ECU 24 and/or unit 50 are or should be illuminated, it causes the indicators 100a–100c to be illuminated or otherwise change state on the display 84,84'. The identifiers 101 assist a technician in identifying the type and location of the fault. In the above example, illumination of the indicators 100a–100c signals a "left" "rear" "sensor" fault as is able to be determined by the associated identifiers 101. Of course, those skilled in the art will recognize that a wide variety of other fault conditions of the ABS 10 are able to be identified and located through use of the LED Status display 84,84'.

Referring again to FIG. 2, the Dashboard Lamp Status display 86 includes an ABS dashboard lamp status indicator 110 and a traction control (ATC) dashboard lamp indicator 112 which are brightened or darkened or made to change color to correspond with the illuminated "on" or darkened "off" state of the actual dashboard lamps 39,41 (FIG. 1), respectively, as controlled by the ECU 24. Accordingly, a technician using the apparatus 60 is able to determine the indicated status of the dashboard lamps 39,41 at all times while viewing the output display 66 and without being located in or near the driver's seat of the vehicle including the ABS 10 (the actual state of the lamps 39,41 can only be verified by visual inspection of same). A technician is also able to position a cursor of the pointing device 64 over each lamp status indicator 110,112 so that a textual description of same is displayed.

Figure 8:
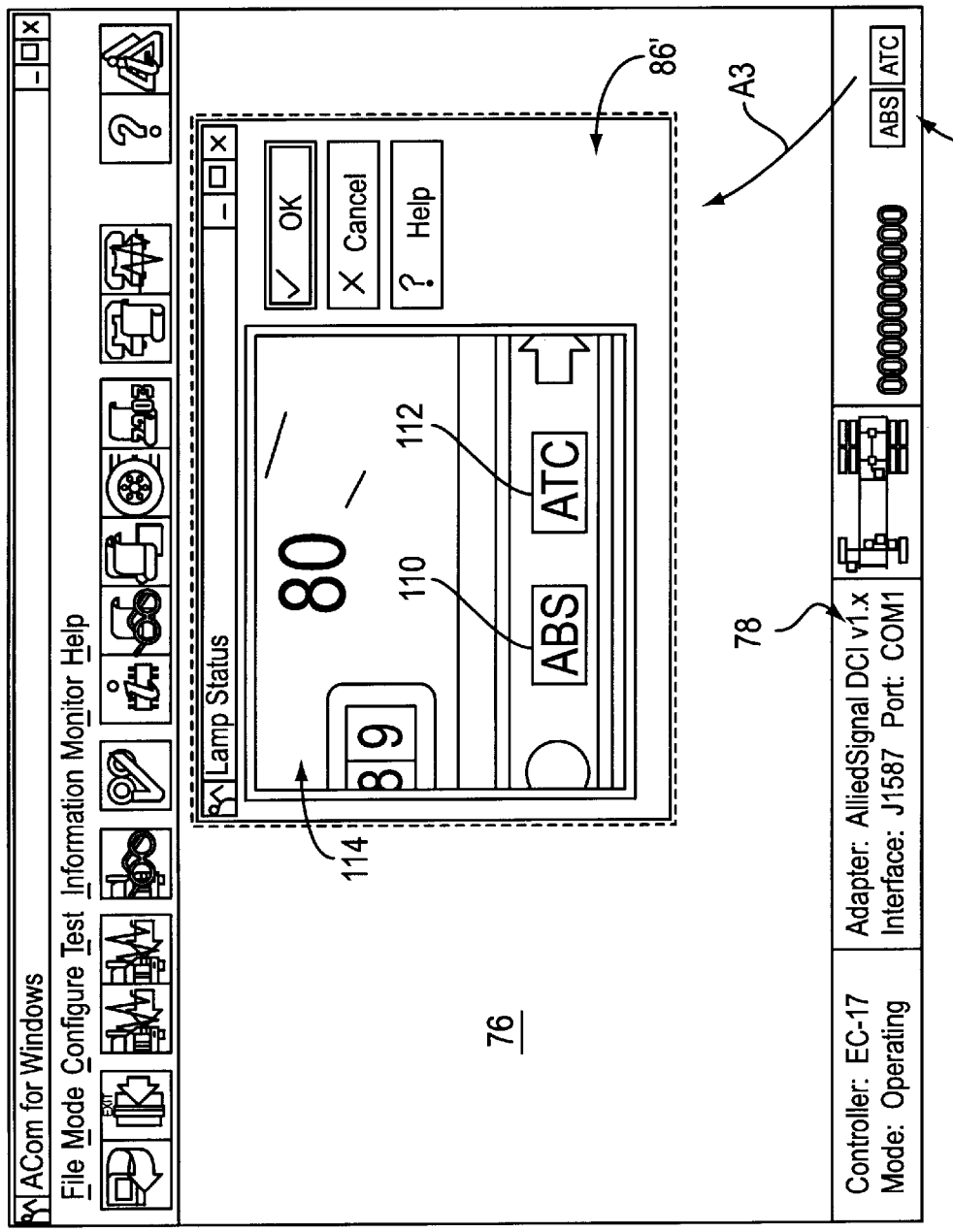

As is shown in FIG. 8, a technician is also able to use the pointing device 64 of the apparatus 60 to select the Dashboard Lamp Status display 86 and move or "drag" same from the status region 78 to the working region 76 as desired (indicated by the arrow A3 and the display 86') This, then, allows the technician to size and locate the display 86' for optimal viewing. Preferably, when the Dashboard Lamp Status display 86 is selected and moved to the working region 76, the resulting display 86' comprises a graphical instrument cluster portion 114 that is displayed for purposes of identifying the display 86' as the Dashboard Lamp Status display—i.e., a technician instantly knows that the display 86' is intended to emulate the status of the dashboard lamps 39,41 due to the presence of the displayed graphical instrument cluster portion 114.

Figure 3A:
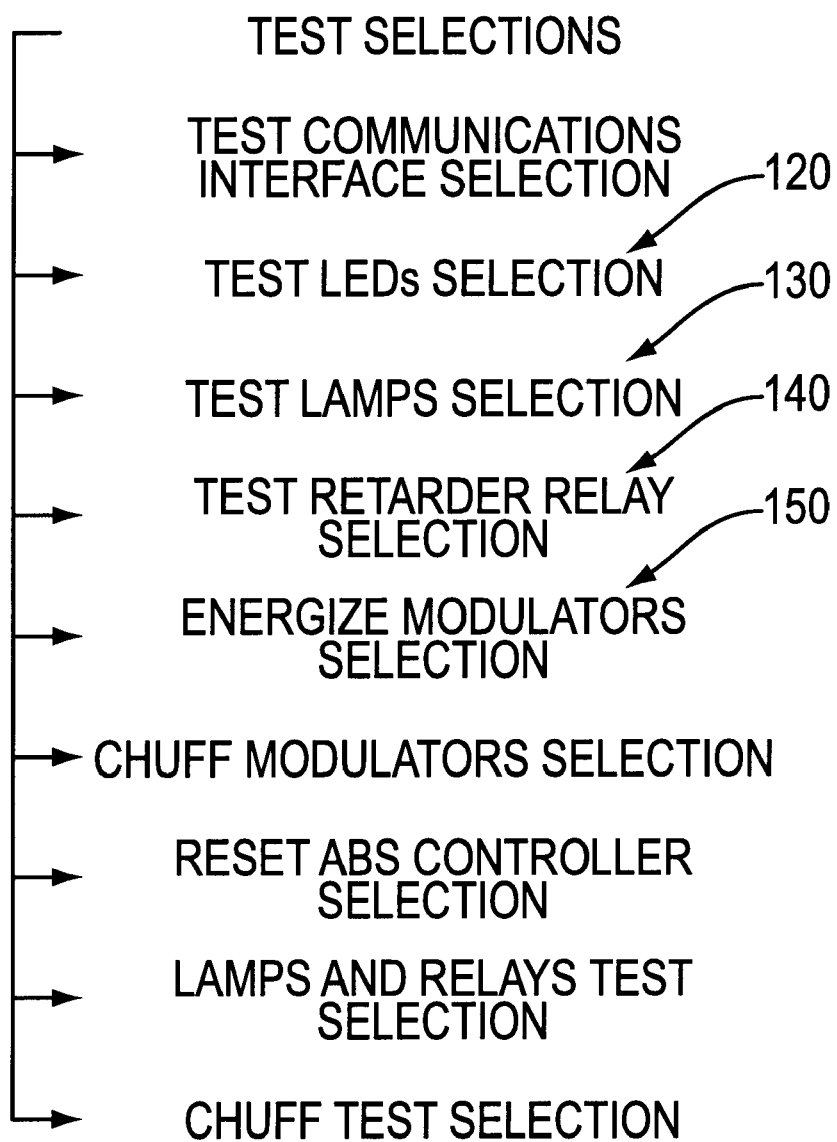
FIG. 3A diagrammatically illustrates the Test Selection menu sub-selections provided in accordance with the present invention.
Figure 3B:
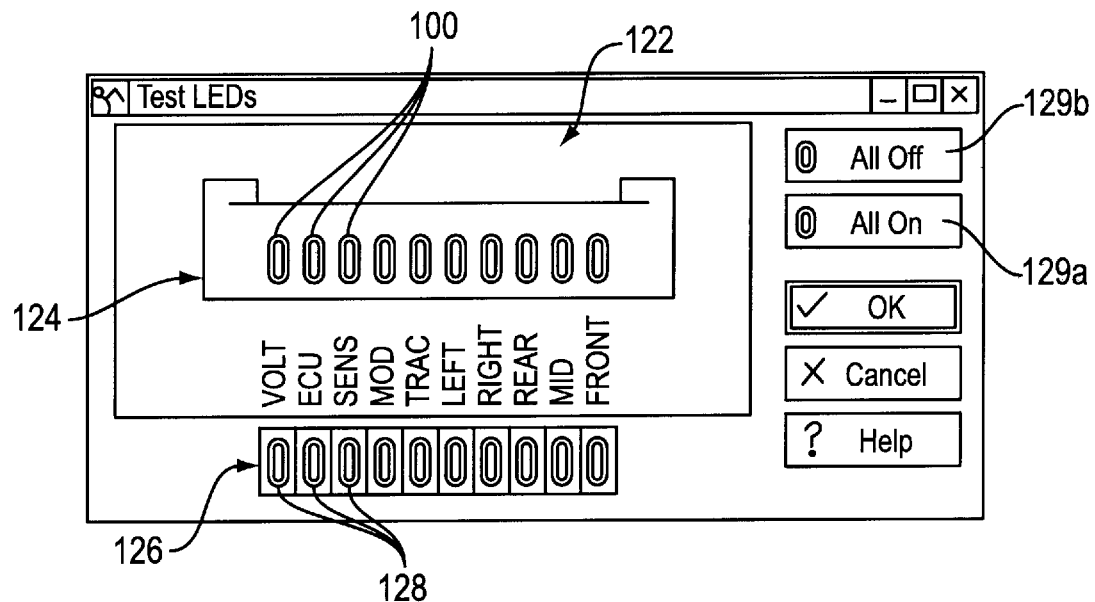
FIG. 3B illustrates graphical emulation of diagnostic lights provided as a part of an anti-lock brake system electronic control unit and/or as a part of a selectively attached interface unit in accordance with the present invention.

FIG. 3A is a chart illustrating the different sub-selections available to a technician when he or she uses the pointing device 64 to choose the "Test" selection from the menu region 72 of the main display 70. The technician can select a "Test LED" sub-selection 120 which causes the apparatus 60 to display a Test LED graphical display 122 (FIG. 3B) which, similar to LED status display 84, includes a plurality of graphical LED indicators 100 corresponding to the output LED's found on the ECU 24 and/or the LED's 52 on the interface unit 50. However, unlike the LED status display 84, the purpose of the display 122 is not merely to emulate the state of each LED on the ECU 24 and/or the unit 50. Instead, the Test LED display 122 includes means for testing the LED's or other such status lights of the ABS 10 for proper operation. In particular, the apparatus 60 provides the Test LED display 122 with a toggle switch or button 128 for each indicator 100. A technician is able to use the pointing device 64 to select the toggle button 128 associated with each indicator 100 for purposes of individually toggling each output LED of the ECU 24 and/or the interface unit 50 (and each associated indicator 100) between the "on" and "off" states. Of course, if a visual inspection reveals the failure of an actual LED or other light of the ABS 10 to change state with its associated displayed graphical indicator 100, this indicates a faulty LED or like problem. The Test LED display 122 further comprises means for changing the state of all status LED's of the ABS 10 and all associated graphical indicators 100 together. Specifically, the Test LED display includes "All On" and "All Off" selector buttons 129a, 129b selectable by the pointing device 64 to turn all LED's of the ABS 10 and the associated indicators 100 "on" and "off," respectively.

Figure 3C:
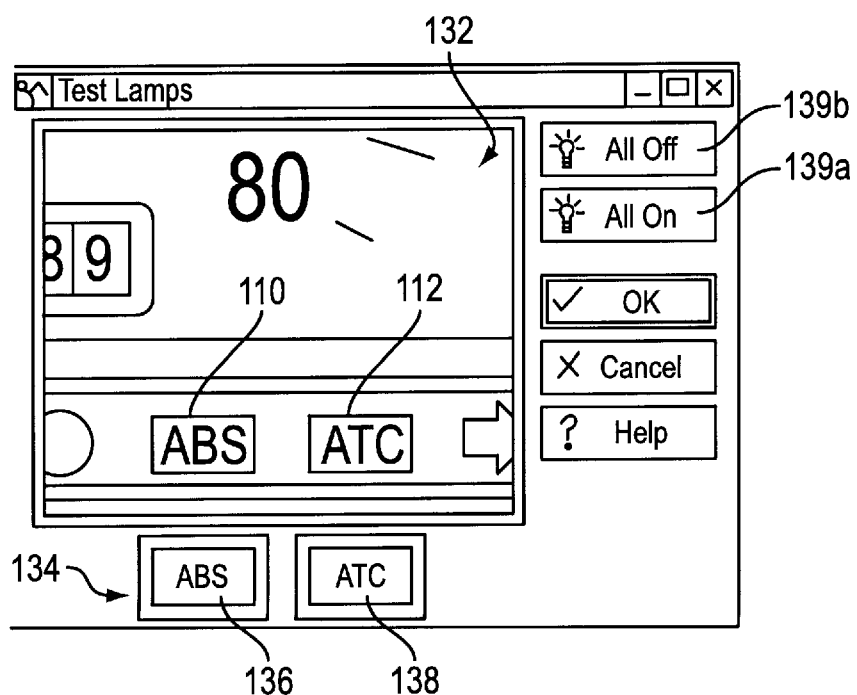
FIG. 3C illustrates graphical emulation of vehicle dashboard indicator lights provided as a part of an anti-lock brake system in accordance with the present invention.

Referring again to FIG. 3A, when a technician uses the pointing device 64 to select the Test Lamps sub-selection 130, the apparatus 60 displays the Test Lamps display 132 (FIG. 3C) on the output display 66. The Test Lamps display 132 is similar to the Dashboard Lamp Status display 86'and includes the ABS and ATC graphical indicators 110,112 as described above. However, the Test Lamps display 132 further comprises means for selectively changing the state of the ABS and ATC indicators 110,112 and, consequently, the ABS and ATC dashboard lamps 39,41. Specifically, the display 132 comprises an ABS indicator toggle button 136 and an ATC indicator toggle button 138 used via the pointing device 64 to toggle the indicators 110,112 and the corresponding dash lamps 39,41 between the "on" or illuminated and "off" or darkened states, respectively. Failure of a lamp 39,41 to change state with its associated graphical indicator 110,112 indicates a defective bulb or like fault in the ABS 10. For convenience, the Test Lamps display 132 further comprises toggle buttons 139a, 139b selectable by the pointing device 64 for turning both indicators 110,112 and their associated lamps 39,41 "on" together and "off" together, respectively. Again, the actual state of the lamps 39,41 must be visually verified to account for burned-out bulbs and other faults.

Figure 3D:
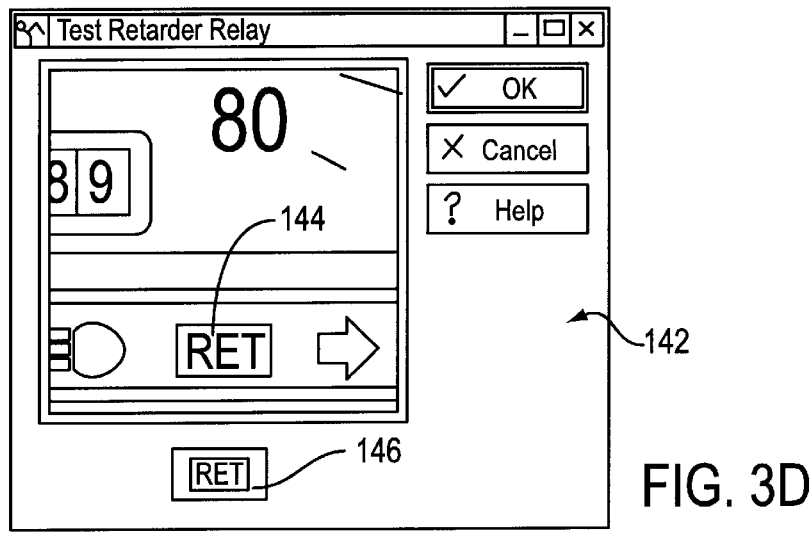
FIG. 3D illustrates graphical monitoring and control of an anti-lock brake system engine retarder relay in accordance with the present invention.

FIG. 3D illustrates the Test Retarder display 142 resulting from a technician's use of the pointing device 64 to select the Test Retarder Relay sub-selection 140 from the test selections shown in FIG. 3A. The Test Retarder Relay display 142 includes a retarder relay indicator 144 and a retarder relay selection button 146. With the engine of the vehicle running, a technician is able to use the pointing device 64 to select the retarder relay selection button 146. If the ABS 10 is functioning properly, upon a technician's selection of button 146, the ECU 24 outputs the appropriate signal on the retarder drive output line 40 which causes the engine to slow. This change in engine speed is audible to the technician and indicates a properly functioning retarder relay circuit in the ABS 10. The Test Retarder Relay display 142 preferably further includes a graphical retarder relay indicator 144 which changes color or otherwise changes state to indicate proper activation of the retarder relay upon technician selection of the button 146. If the engine does not slow and/or the indicator 144 does not change state, this indicates a malfunctioning retarder relay circuit in the ABS 10—i.e., the technician is able to identify a properly functioning retarder relay by listening for the engine of the vehicle to slow upon selection of the button 146 with the pointing device 64.

By technician selection of the Energize Modulators subselection 150 (FIG. 3A) from the Test menu, the apparatus 60 displays the Energize Modulators Test display 152 (FIG. 3E) in the working region 76 of the display 70. The display 152 comprises a graphical ABS display region or icon 154 which depicts or represents the ABS 10 being monitored/controlled with the apparatus 60. Preferably, each brake modulator 28,30 and traction modulator 38 of the ABS 10 is graphically represented or indicated on the graphical ABS display region 154 by indicators 28',30',38', respectively. Each brake modulator indicator 28',30' includes associated therewith an exhaust selection box 156 and a hold selection box 158. The traction modulator indicator 38' includes a single select box 160 associated therewith. Accordingly, through use of the pointing device 64, a technician is able to select or un-select the exhaust and hold selection boxes 156,158 associated with each brake modulator indicator 28',30', and likewise is able to select or un-select the traction modulator selection box 160.

Furthermore, the Energize Modulator Test display 152 includes means for technician input of a solenoid energization time for the solenoids associated with each modulator 28,30,38. In particular, the display 152 includes a Energize Time entry region 162 where a technician is able to enter an energize time in the range of using the keyboard 68. For example, the technician may enter an energize time up to 2 seconds, after which time power to the solenoid is cut to prevent damage to the solenoid. The Energize Modulator Test display 152 further comprises an graphical Execute button or region 164 which is selectable by a technician with the pointing device 64 to cause the ABS and traction modulators 28,30,38 to be tested in accordance with the selected exhaust and hold selection boxes 156,158, the traction modulator selection box 160, and the energize time as entered by the technician in the region 162.

Figure 3E:
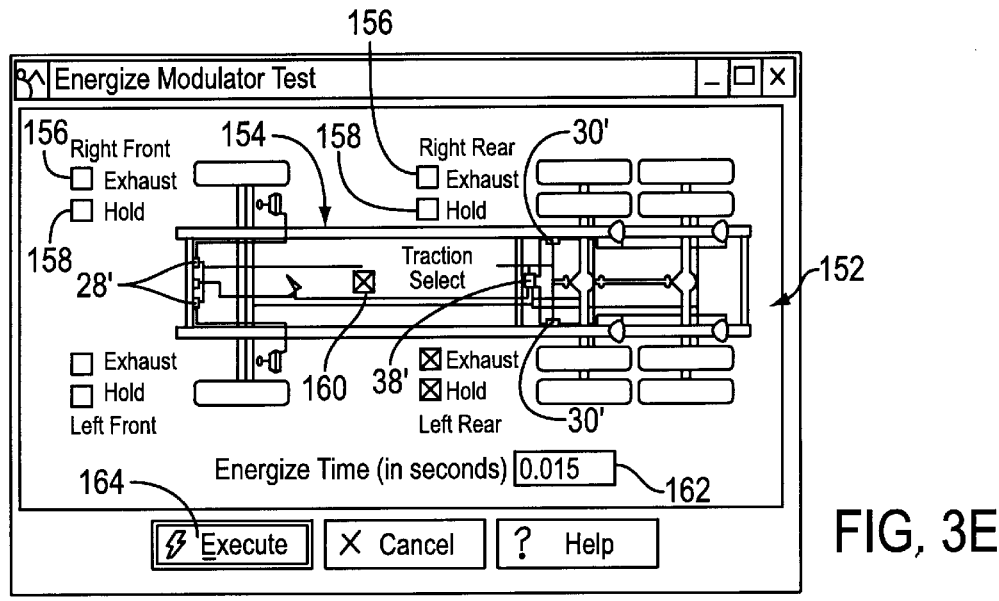
FIGS. 3E and 3F illustrate graphical control of anti-lock brake system modulators in accordance with the present invention.

For example, as shown in FIG. 3E, the technician has selected the traction box 160 and the Exhaust and Hold selection boxes 156,158 for the left rear brake modulator 30. In this example, the technician has entered an energize time of 0.015 seconds in the region 162. Accordingly, when the technician uses the pointing device 64 to select the Execute button 164, the solenoid of the traction modulator 38 and the exhaust and hold solenoids of the left rear brake modulator 30 of the ABS 10 will be energized simultaneously for 0.015 seconds if the ABS 10 is properly functioning. In another example, to assess total current draw by the modulators 28,30,38, all boxes 156,158,160 may be selected with the pointing device 64 prior to selection of the Execute button 164 with the pointing device 64.

Figure 3F:
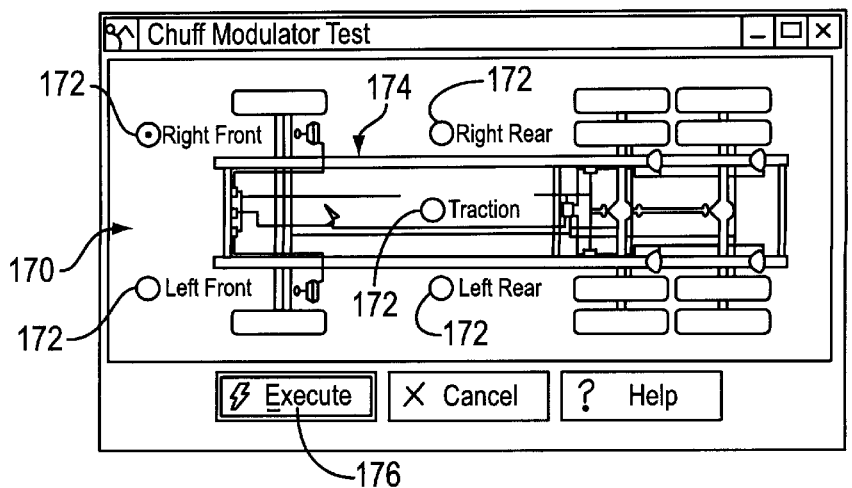

The apparatus 60 also includes means for testing the modulators 28,30,38 and their connection to the ABS 10 through use of a "Chuff-Modulators" Test display 170 as illustrated in FIG. 3F. For each modulator 28,30,38 of the ABS 10, the Chuff-Modulator Test display 170 includes a modulator select button 172 located in a corresponding position on a graphical representation 174 of the ABS 10.

Using the pointing device 64, a user is able to select or unselect each button 172 to include or exclude a subject modulator 28,30,38 from a Chuff-Modulator test. The technician then uses the pointing device 64 to select the "Execute" button 176 which forms a part of the display 170. This, then, causes the apparatus 60 to send the appropriate commands to the ECU 24 so that the ECU 24 energizes the hold and exhaust solenoids of the selected modulator 28,30, 38 which causes a "chuffing" sound to emanate from the ABS 10 at the location of the selected modulator 28,30,38 by building a small amount of air pressure in the brake chamber at the specified location and thereafter releasing same. The Chuff Modulator test can only be performed on one modulator 28,30,38 at a time. If the technician does not hear the distinct chuffing sound from each selected modulator, he/she will know that the modulator from which the proper sound is not heard is faulty or that it has not been properly wired into the ABS 10.

Figure 4A:
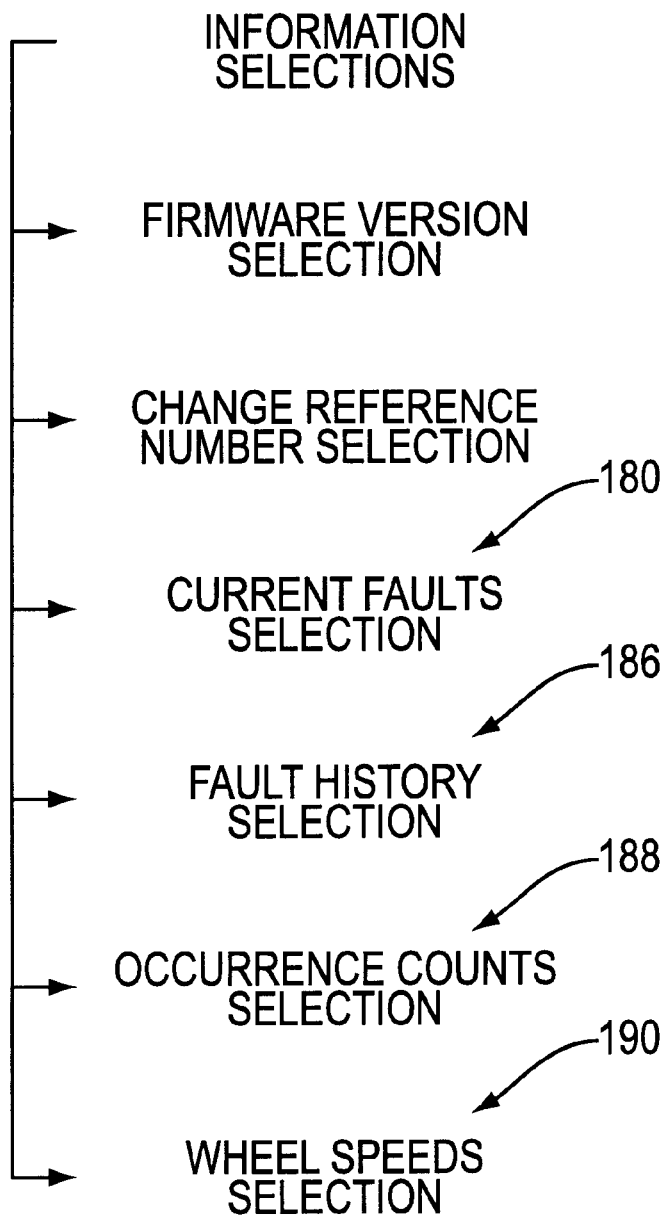
FIG. 4A diagrammatically illustrates the Information Selection menu sub-selections provided in accordance with the present invention.
Figure 4B:
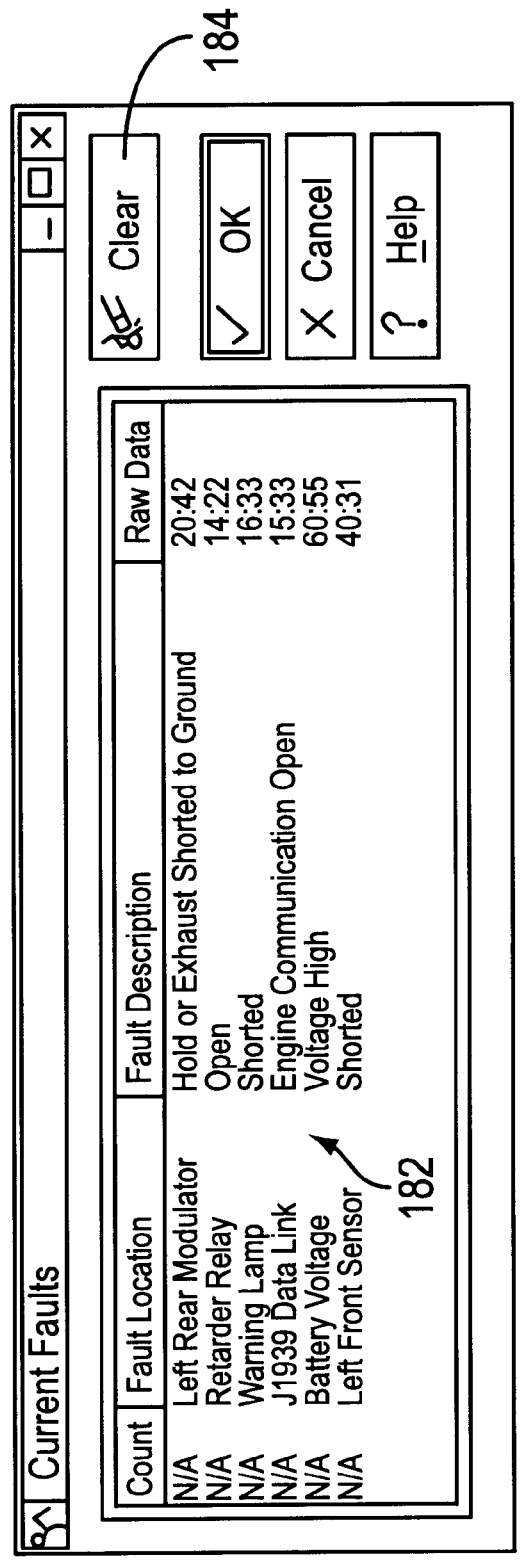
FIG. 4B illustrates textual output of anti-lock brake system current fault data in accordance with the present invention.

FIG. 4A illustrates the different sub-selections displayed to a technician when he/she uses the pointing device 64 to select the "Information" selection from the menu region 72 of the main display 70. Selection of the "Current Faults" sub-selection 180 causes the apparatus 60 to request and receive, through the interface unit 50, data concerning all faults presently found in the ABS 10. These are displayed in textual form as shown in FIG. 4B. The displayed faults 182 may be cleared from the current fault display 182 by technician selection of the displayed "clear" button 184. As is shown in FIG. 4A, other information concerning faults is available to the technician through the sub-selections, e.g., the fault history sub-selection 186 and the fault occurrence count sub-selection 188.

Figure 4C:
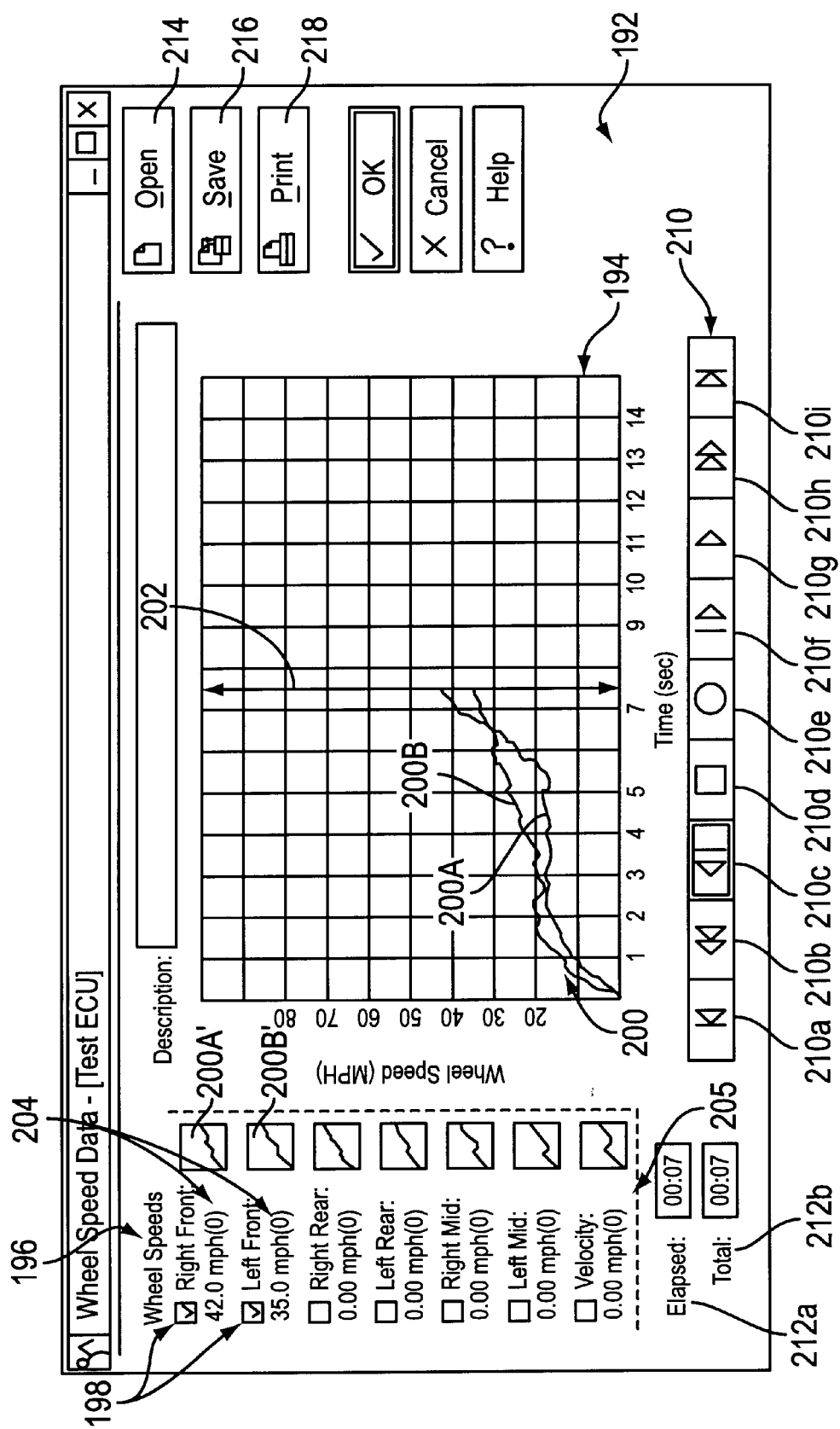
FIG. 4C illustrates graphical display, recording, and playback of wheel speed data for each wheel controlled by the vehicle anti-lock brake system.

When a technician selects the Wheel Speeds subselection 190, the apparatus 60 displays (FIG. 4C) the Wheel Speed Data display 192 by which a technician is able to graphically monitor the speed of each wheel 12a,12b,14a,14b under the control of the ABS 10. The wheel speed display includes a graphical wheel speed viewing region 194 and a wheel selection region 196 which includes a textual description or other indication of each wheel 12a–14b. A technician is able to include or exclude each wheel 12a–14b on the display 192 by using the pointing device 64 to select or un-select the selection box 198 provided in association with the description or other indication of each wheel 12a–14b. If a box 198 is selected using the pointing device 64, rotational speed of the wheel associated with the box 198 (typically due to manual rotation by a technician or a vehicle test drive) is graphically displayed in the wheel speed viewing region 194 of the display 192 using a suitable graphical format such as a color-coded line graph 200. For example, as shown herein, the boxes 198 associated with the left and right front wheels 12a,12b have been selected by a technician. Upon rotation of these wheels 12a, 12b, color-coded line graphs 200a,200b are respectively displayed in the region 194 and represent real-time wheel speed (preferably in miles per hour (mph)) of the subject wheels 12a, 12b. A color-code key or identifier is provided in the wheel selection region 196 in association with each listed wheel 12a–14b, such as the color-code identifiers 200a',200b' provided in association with the left and right front wheels 12a, 12b, for purposes of informing a technician as to the color of the line graph 200 for that particular wheel.

The wheel speed viewing region 194 preferably displays the wheel speed data graphically with the wheel speed (mph) represented on the vertical axis and time (seconds) represented on the horizontal axis. As wheel speed data is graphically displayed in the region 194, a graphical status bar 202 moves laterally thereacross (from left to right with increasing time) and facilitates a technician's ability to compare wheel speeds among a plurality of different line graphs 200 representing the wheel speeds of plural wheels 12a–14b, and facilitates a technician's ability to determine the elapsed time. Not only is the technician able to view the graphical wheel speed data in the region 194, he/she is able to read a numerical wheel speed output indicator 204 provided in association with each wheel listed in the wheel selection region 196 which displays the numerical speed of each selected wheel 12a–14b (only wheels 12a, 12b are selected in FIG. 4C) and a vehicle velocity indicator 205 which displays the speed at which the vehicle would be traveling based upon the sensed wheel speeds. The numerical wheel speed value displayed by the indicator 204 for each wheel is the wheel speed at the location of the status bar 202 on the line graphs 200. For example, it may be seen in FIG. 5C that, for the selected wheels 12a, 12b, the wheel speed indicators 204 displays wheel speeds of 42 mph and 35 mph, respectively, as is reflected in the graphical wheel speed viewing region 194 at the intersection of the line graphs 200a,200b and the status bar 202.

The Wheel Speed Data display 192 also includes means by which a technician is able, through use of the pointing device 64, to record, play-back, and otherwise manipulate wheel speed data as received from the interface unit 50 of the ABS 10. In particular, the display 192 comprises a plurality of wheel speed data control buttons, selectable and unselectable by the pointing device 64, including:

1. a Reset data button 210a for completely and immediately "rewinding" or resetting previously recorded wheel speed data to its beginning;

2. a Rewind data button 210b for reviewing previously recorded data at high speed;

3. a One-Sample Reverse button 210c for backwardly stepping through previously recorded wheel speed data;

4. a Stop button 210d for stopping play-back, recording, rewinding, and fast-forward of wheel speed data;

5. a Record button 210e for recording wheel speed data for later saving to a file;

6. a One-Sample Forward button 210f for forwardly stepping through previously recorded wheel speed data;

7. a Play button 210g for graphically displaying previously recorded wheel speed data;

8. a Fast-Forward data button rapidfor rapidly advancing through previously recorded wheel speed data; and, 9. an End data button 210i for immediately advancing through previously recorded wheel speed data to its end.

The Wheel Speed Data display 192 also includes a graphical elapsed time indicator 212a and a graphical total time indicator 212b for displaying, to a technician, the elapsed time of the wheel speed data at the location of the status bar 202, and the total time of wheel speed data available, respectively. Of course, when wheel speed data is being graphically viewed as it is recorded, the elapsed time indicator 212a and the total time indicator 212b are equal.

The Wheel Speed Data display 192 further includes "open" "save" and "print" buttons 214,216,218 selectable via the pointing device 64 to open a file including previously recorded wheel speed data, to save recorded wheel speed data to a permanent data file, and to print the Wheel Speed Data display 192 for a hard-copy output of same, respectively.

Therefore, using the Wheel Speed Data display 192, alone or preferably together with any other graphical display described and illustrated herein, a technician is able to view graphical data representing the rotational wheel speed of any wheel 12a–14b of the ABS 10. For example, it may be desirable for a technician to simultaneously view the Wheel Speed Data display 192 with the Fault Status display 82' (FIG. 6) for purpose of assessing the effect of wheel speed on one or more faults indicated on the Fault Status display 82'.

Figure 5A:
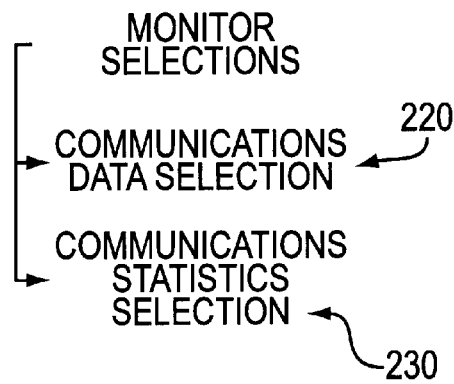
FIG. 5A diagrammatically illustrates the Monitor Selection menu sub-selections provided in accordance with the present invention.
Figure 5B:
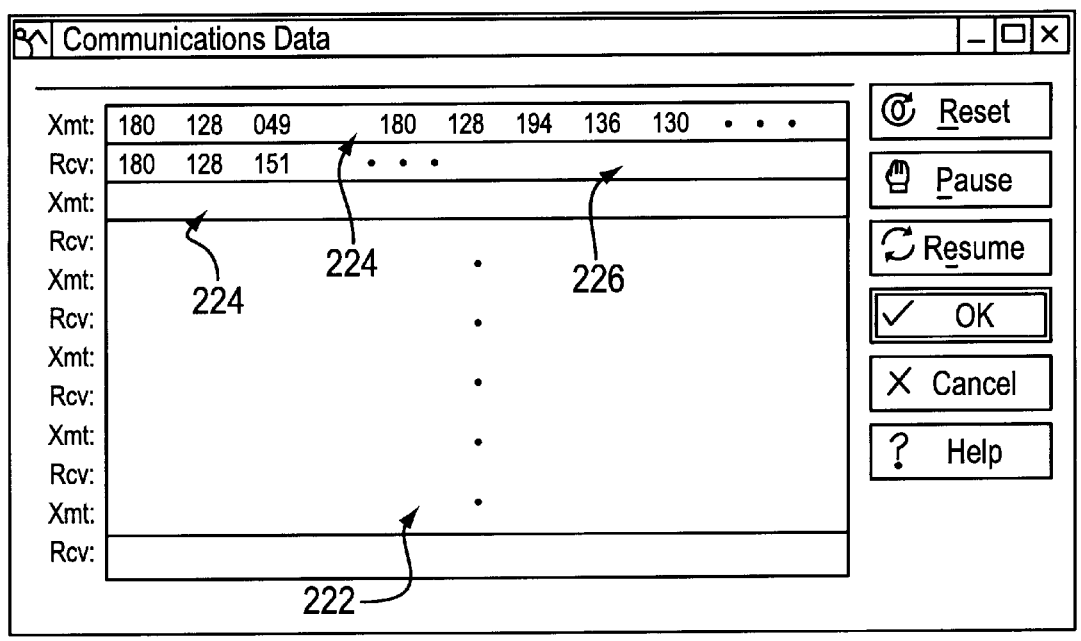
FIGS. 5B and 5C illustrate graphical display of communications data and communication data statistics for data passing between the anti-lock brake system electronic controller and an apparatus formed in accordance with the present invention.

Referring now to FIG. 6A, the various subselections available to a technician upon selecting the "Monitor" selection from the menu region 72 are shown. When a technician uses the pointing device to select "Communications Data" sub-selection 220, the apparatus 60 outputs the Communications Data display 222 (FIG. 5B) to the technician. The Communications Data Display 222 comprises a plurality of alternate transmit data output regions 224 and receive data output regions 226. The apparatus 60 displays the raw data transmitted thereby to the ECU 24 (through the interface 50) in the transmit data output regions 224 and displays the raw data received from the ECU 24 in the receive data output regions 226. This, then, allows a technician or remotely located technical support personnel to monitor data flow between the ECU 24 and the apparatus 60, alone or together with the other graphical data displays described herein, for purposes of locating and identifying communications errors and/or other system faults or faults with the apparatus 60.

Figure 5C:
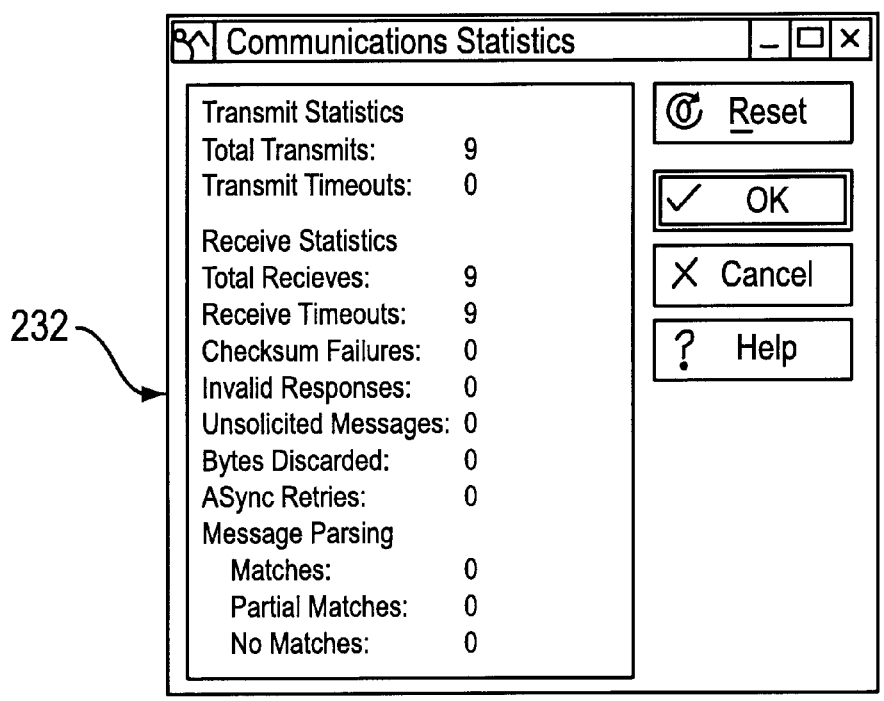

The apparatus 60 also includes means for statistically analyzing data flow between the ECU 24 and the apparatus 60. Upon a technician's selection of the "Communications Statistics" sub-selection 230, the Communications Statistics display 232 (FIG. 5C) is displayed. This display includes detailed statistical data concerning communications between the ECU 24 and the apparatus 60. FIG. 5C illustrates the preferred statistical information that is displayed to a technician by the Communications Statistics display 232.

The invention has been described with reference to preferred embodiments. Obviously, modifications and alterations will occur to others upon reading and understanding the preceding specification. It is intended that the invention be construed as including all such modifications and alterations insofar as they fall within the scope of the following claims.

Having thus described the preferred embodiments, the invention is claimed to be:

1. A method of graphically monitoring an anti-lock braking system of a vehicle, said method comprising:

receiving fault status data representing anti-lock braking system faults from an electronic control unit of the anti-lock braking system;

displaying a graphical anti-lock braking system current fault status display to a technician including:

displaying a graphical representation of the vehicle anti-lock braking system, and displaying at least one graphical fault indicator at a select location on the graphical representation of the anti-lock braking system, said at least one graphical fault indicator associated with at least one component of said anti-lock braking system and displayed to indicate the presence of a fault condition in the at least one anti-lock braking system component associated therewith.

2. The method of graphically monitoring an anti-lock braking system of a vehicle as set forth in claim 1, further comprising:

receiving anti-lock braking system indicator light status data representing the state of at least one indicator light of the anti-lock braking system from the electronic control unit; and, displaying a graphical anti-lock braking system indicator light status display to a technician including displaying at least one indicator light display region corresponding to the at least one indicator light of the anti-lock braking system, said at least one indicator light display region displayed in one of a first state and a second state corresponding respectively to an on and an off state of said at least one indicator light of the anti-lock braking system.

3. The method of graphically monitoring an anti-lock braking system of a vehicle as set forth in claim 2, wherein step of displaying a graphical anti-lock braking indicator light status display comprises:

displaying a graphical anti-lock braking system indicator light status display including a plurality of LED indicator light display regions each in one of said first and second states according to a corresponding plurality of LED indicator lights provided as a part of the anti-lock braking system.

4. The method of graphically monitoring an anti-lock braking system of a vehicle as set forth in claim 3, wherein said step of displaying a graphical anti-lock braking system indicator light status display further includes:

displaying at least one dash-board indicator light display region in one of a first and a second state corresponding respectively to an on state and an off state of a dash board indicator light provided as a part of said vehicle anti-lock braking system.

5. The method of graphically monitoring an anti-lock braking system of a vehicle as set forth in claim 4, wherein said step of displaying a dashboard indicator light display region to a technician comprises:

displaying an ABS indicator light display region corresponding to an ABS indicator light provided on a dash-board of the vehicle to indicate the status of the anti-lock braking system to a driver of the vehicle; and displaying a traction-control indicator light display region corresponding to a traction control indicator light provided on the dash-board of the vehicle to indicate the state of a traction-control function of the anti-lock braking system to a driver of the vehicle.

6. The method of graphically monitoring an anti-lock braking system of a vehicle as set forth in claim 2, further comprising:

continuously receiving wheel speed data from the electronic control unit for each of a plurality of wheels of said vehicle; and, using said wheel speed data to display a graphical representation of said wheel speed data for at least one of said wheels, said graphical wheel speed data including a graphical indication of wheel speed versus time.

7. The method of graphically monitoring an anti-lock braking system of a vehicle as set forth in claim 6, further comprising:

recording said wheel speed data received from the electronic control unit for said at least one of said wheels and saving the recorded wheel speed data in a data file;

thereafter, accessing the data file to read the recorded wheel speed data therefrom; and using the recorded wheel speed data read from the data file to display a graphical representation of said wheel speed data for said at least one of said plurality of wheels, said displayed graphical wheel speed data including a graphical indication of wheel speed versus time.

8. The method of graphically monitoring an anti-lock braking system of a vehicle as set forth in claim 1, further comprising:

monitoring data communication between the electronic control unit and an external device;

displaying a graphical representation of all data communication between the electronic control unit and the external device including separate data transmit regions for displaying data transmitted by the electronic control unit and data receive regions for displaying data received by the electronic control unit.

9. The method of graphically monitoring an anti-lock braking system of a vehicle as set forth in claim 8, further comprising:

calculating statistical data regarding the monitored communication data; and, displaying said calculated statistical data for review to facilitate identification of data communication errors between said electronic control unit and said external device.

10. An apparatus for graphically monitoring and controlling a vehicle anti-lock braking system, said apparatus comprising:

a computer apparatus adapted for selective connection to an electronic control unit of the anti-lock braking system, said computer apparatus including:

a visual output device for outputting graphical data received from said computer apparatus;

a keyboard for operator input of data to said computer apparatus;

a pointing device for operator input of commands to said computer apparatus through a graphical user interface;

means for receiving fault data from the electronic control unit of the anti-lock braking system;

means for outputting a graphical fault status display to said visual output device, said fault status display including:

(i) a graphical representation of a vehicle anti-lock braking system; and (ii) at least one graphical fault indicator displayed at a select location on the graphical representation of a vehicle anti-lock braking system, said graphical fault indicator associated with at least one component of the anti-lock braking system and displayed in a fault state to indicate a fault associated with said at least one associated anti-lock brake system component;

means for outputting a graphical modulator test display to said visual output device, said graphical modulator test display including (i) regions selectable by the pointing device to selectively include each of a plurality of modulators of said anti-lock braking system in a modulator test, and (ii) a region selectable by the pointing device to instruct said electronic control unit to operate exhaust and hold solenoids for each of said modulators of said anti-lock braking system included in said modulator test.

11. The apparatus as set forth in claim 10, further comprising:

means for graphically emulating, on the visual output device, a plurality of status output indicator lights provided as a part of the electronic control unit of the anti-lock braking system.

12. The apparatus as set forth in claim 11, further comprising:

means for graphically emulating, on the visual output device, at least one dashboard indicator light provided as a part of said anti-lock braking system.

13. The apparatus as set forth in claim 12, further comprising:

means for displaying a graphical retarder relay control display on said visual output device, said retarder relay control display including a graphical retarder test region selectable by said pointing device to cause said electronic control unit of said anti-lock braking system to change the state of an engine retarder relay of said anti-lock braking system.

14. The apparatus as set forth in claim 11, further comprising:

means for displaying, on said visual output device, all data communication between said computer and said electronic control unit.

15. The apparatus as set forth in claim 10, further comprising:

means for receiving wheel speed data from the electronic control unit of the anti-lock braking system for each of a plurality of wheels of said vehicle; and, means for displaying a graph of the wheel speed data received for at least one of the plurality of wheels on the visual output device.

16. The apparatus as set forth in claim 15, further comprising:

means for saving wheel speed data received from the electronic control unit to a data file.

17. A method of monitoring and controlling a vehicle anti-lock braking system (ABS), said method comprising:

displaying a graphical representation of at least one output indicator light of said ABS to a technician, said at least one output indicator light of said ABS and said graphical representation thereof each having first and second states;

displaying a graphical switch region to a technician, said switch region selectable by a technician using a graphical user interface pointing device;

changing the state of both said at least one output indicator light and said graphical representation of said at least one output indicator light upon selection of said at least one graphical switch region with a graphical user interface pointing device.

18. The method of monitoring and controlling a vehicle ABS as set forth in claim 17, further comprising:

receiving wheel speed data from an electronic control unit of said ABS, said wheel speed data describing the rotational speed of a plurality of wheels of said vehicle; and, using said received wheel speed data to display a graphical representation of the rotational speed of at least one wheel of said vehicle.

19. The method of monitoring and controlling a vehicle ABS as set forth in claim 18, further comprising:

recording said wheel speed data received from the electronic control unit;

saving said recorded wheel speed data to a data file;

thereafter, accessing said data file to retrieve said recorded wheel speed data; and, displaying a graphical representation of said retrieved wheel speed data.

20. The method of monitoring and controlling a vehicle ABS as set forth in claim 18, further comprising:

displaying a graphical representation of at least one modulator of the ABS;

displaying a graphical selection region, associated with said graphical representation of said at least one ABS modulator, selectable by a graphical user interface pointing device to include said at least one associated ABS modulator in a modulator test; and, displaying a graphical switch region selectable by said pointing device for instructing said electronic control unit to energize a solenoid associated with said at least one modulator included in said modulator test.

\* \* \* \* \*